US008682540B2

(12) United States Patent
Missotten et al.

(10) Patent No.: US 8,682,540 B2
(45) Date of Patent: Mar. 25, 2014

(54) METHOD FOR DIRECTING AN UNLOADING APPARATUS OF A HARVESTING MACHINE TO A CONTAINER

(75) Inventors: Bart M. A. Missotten, Winksele Herent (BE); Didier O. M. Verhaeghe, Ieper (BE); Ward M. R. Byttebier, Zwevegem (BE); Karel M. C. Viaene, Ghent (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/579,182

(22) PCT Filed: Feb. 18, 2011

(86) PCT No.: PCT/EP2011/052471
§ 371 (c)(1),
(2), (4) Date: Aug. 15, 2012

(87) PCT Pub. No.: WO2011/101458
PCT Pub. Date: Aug. 25, 2011

(65) Prior Publication Data
US 2012/0316737 A1    Dec. 13, 2012

(30) Foreign Application Priority Data

Feb. 21, 2010    (BE) ..................................  2010/0103

(51) Int. Cl.
*G06F 19/00*    (2011.01)
(52) U.S. Cl.
USPC .......................................................... 701/50
(58) Field of Classification Search
USPC .......................................................... 701/50
See application file for complete search history.

(56) References Cited

U.S. PATENT DOCUMENTS

| | | | |
|---|---|---|---|
| 5,575,316 A | 11/1996 | Pollklas | |
| 5,629,989 A * | 5/1997 | Osada | 382/281 |
| 5,749,783 A | 5/1998 | Pollklas | |
| 6,963,664 B2 * | 11/2005 | Braspenning et al. | 382/173 |
| 2002/0048402 A1 * | 4/2002 | Braspenning et al. | 382/173 |
| 2003/0145571 A1 | 8/2003 | Diekhans | |
| 2003/0174207 A1 | 9/2003 | Alexia et al. | |
| 2009/0044505 A1 * | 2/2009 | Huster et al. | 56/10.2 R |
| 2010/0063692 A1 | 3/2010 | Madsen et al. | |
| 2010/0108188 A1 | 5/2010 | Correns et al. | |

FOREIGN PATENT DOCUMENTS

WO    2008/101694    *  8/2008

* cited by examiner

*Primary Examiner* — Mary Cheung
*Assistant Examiner* — Anne Mazzara
(74) *Attorney, Agent, or Firm* — Patrick M. Sheldrake

(57) ABSTRACT

The present invention relates to a method for directing a movable unloading apparatus (1) of an agricultural harvesting machine to a container (4) driven adjacent the harvesting machine, the container comprising—as seen from the harvesting machine—near and remote upper borders (6,8). An image of the container is taken by a 3-D camera, in the form of an array of pixels, wherein the camera also generates for each pixel a value of the distance between the camera and the object in the image. The image is analyzed by selecting a number of vertical strips (21,22,23) in the image, determining the filtered distance values for each vertical position along the strips, and determining from these distance values the positions of the near and remote upper borders (6,8). On the basis of these data, the unloading apparatus (1) is moved towards a predetermined position relative to the container, said predetermined relative position being a position wherein the unloading apparatus directs the harvested crop (3) to a position above said near upper border (6) and/or below said remote upper border (8), respectively.

15 Claims, 4 Drawing Sheets

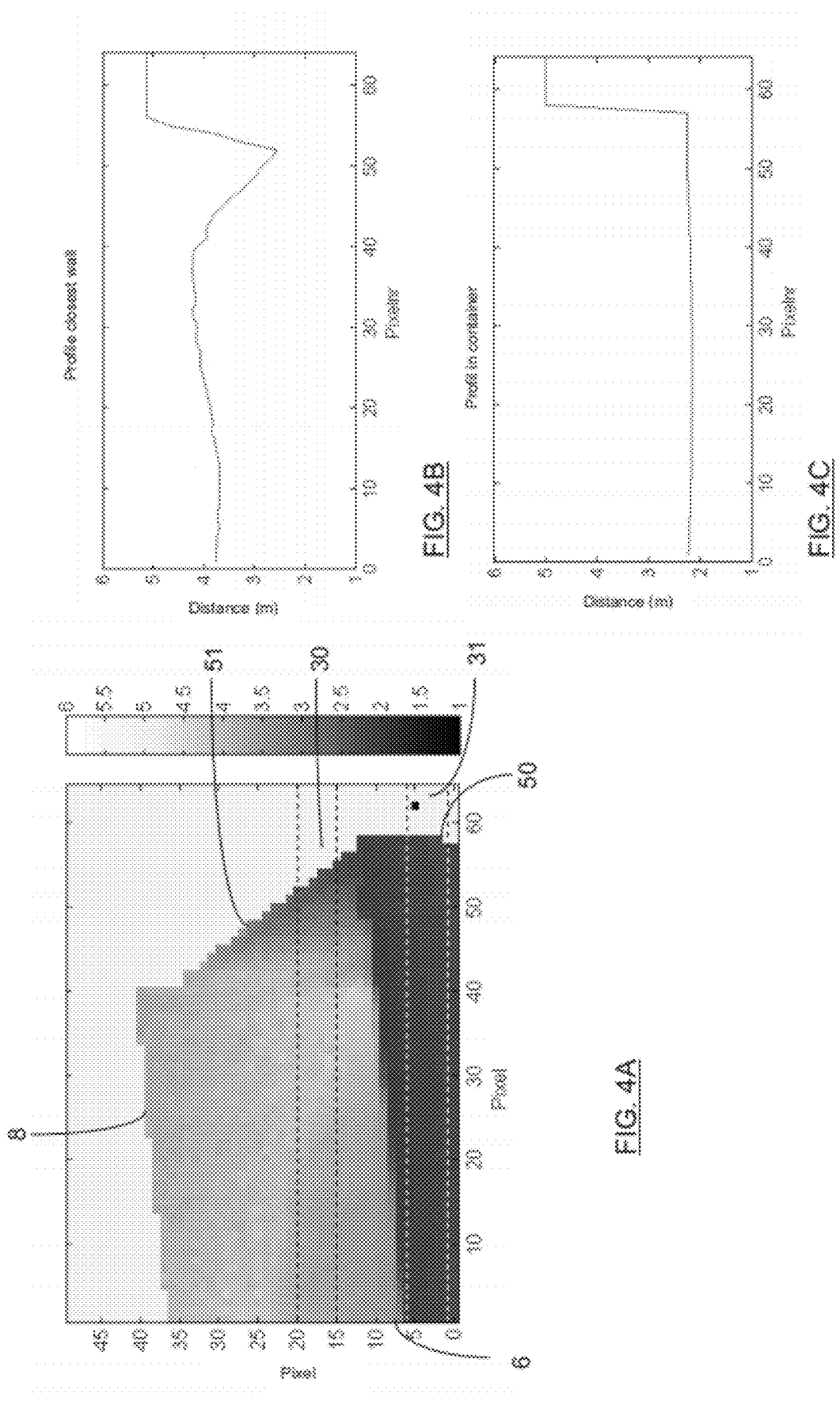

METHOD FOR DIRECTING AN UNLOADING APPARATUS OF A HARVESTING MACHINE TO A CONTAINER

CROSS REFERENCE TO RELATED APPLICATION

This application is the US National Stage for International Application No. PCT/EP2011/052471, filed Feb. 18, 2011, which itself is related to and claims the benefit of Belgian Application No. BE 2010/0103, filed Feb. 21, 2010.

FIELD OF THE INVENTION

The present invention is related to agricultural harvesting machines, such as combine or forage harvesters, equipped with an unloading apparatus (such as a spout) for filling harvested and processed crop materials into a container travelling alongside the harvester. The invention is related to methods for controlling the filling of such a container on the basis of image data of the container.

STATE OF THE ART

In forage harvesters of the above type, control of the spout position and of the position of a pivotable end portion (flap) of the spout on the basis of camera images is known in the art. EP2020174 describes a harvester equipped with an electro-optical device configured to detect characteristic parameters of the spout and/or of the container and the harvester. The electro-optical device may be a camera system capable of obtaining three-dimensional image data of the container filling area, to derive characteristic parameters from such data. Among such parameters are the spatial position and height of the side walls of the container, as well as the filling height of crop already deposited in the container. The methods for processing the image data involve the recognition of patterns and characteristic lines in the image. Such methods however require rather complex image recognition algorithms and may lack robustness, accuracy and speed.

AIM OF THE INVENTION

It is an object of the invention to provide a method for processing image data of the filling area which allows a more efficient and simplified control of the filling process.

SUMMARY OF THE INVENTION

The present invention pertains to a method and harvesting machine as disclosed in the appended claims. The method of the invention provides the advantage that the analysis of the image is based on a limited portion of the region, in particular on a number of strips selected in the image. This allows a fast and efficient analysis.

According to one aspect of the invention there is provided a method for directing a movable unloading apparatus of an agricultural harvesting machine to a container driven adjacent the harvesting machine, the container comprising, as seen from the harvesting machine, near and remote upper borders, the method comprising the steps of:

using a camera on the harvesting machine for capturing images of at least a portion of the container, the camera generating image data containing data on the distance between the camera and the portion of the container;

processing the image data for deriving therefrom data on the relative position between the portion of the container and the unloading apparatus; and using the relative position data for automatically moving the unloading apparatus relative to the harvesting machine towards a predetermined position relative to the container, characterised in that the step of processing the image data comprises:

selecting from the captured image the image data pertaining to a vertical strip on the left and/or right hand side of the unloading apparatus;

for the or each vertical strip filtering the distance data for each vertical position to generate a single filtered distance value for that vertical position; and for the or each strip analysing the sequence of filtered distance values for deriving therefrom the vertical position of the near and/or remote upper border of the container; and wherein the predetermined relative position is a position wherein the unloading apparatus directs the harvested crop to a position above said near upper border and/or below said remote upper border, respectively.

The analysis of the distance values in each strip may provide data on the level of crop in the container and the available space in the container for further filling without piling up the crop above the borders. The location of borders, levels and/or edges may be derived from the distance data, e.g., from a first or second derivative of the distance sequence.

Advantageously, the image processing may also comprise the analysis of a vertical strip in the image to derive therefrom the presence of a left or right corner of the container or the presence of a left or right upper border. These data can be used to limit or revert the movement of the unloading apparatus relative to the container.

According to a further aspect of the present invention, there is provided a harvesting machine equipped with an unloading apparatus for unloading crop materials into a container moving alongside the harvesting machine, a 3D camera being mounted in connection to the harvesting machine, said harvesting machine further comprising control means configured to direct the movable unloading apparatus according to the method of the first aspect of the invention. The harvesting machine may comprise a forage harvester provided with a spout or a combine harvester provided with an unloading tube for the grain tank.

BRIEF DESCRIPTION OF THE DRAWINGS

FIG. 4 shows a further example of an image and distance curves suitable for use in the method of the invention.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
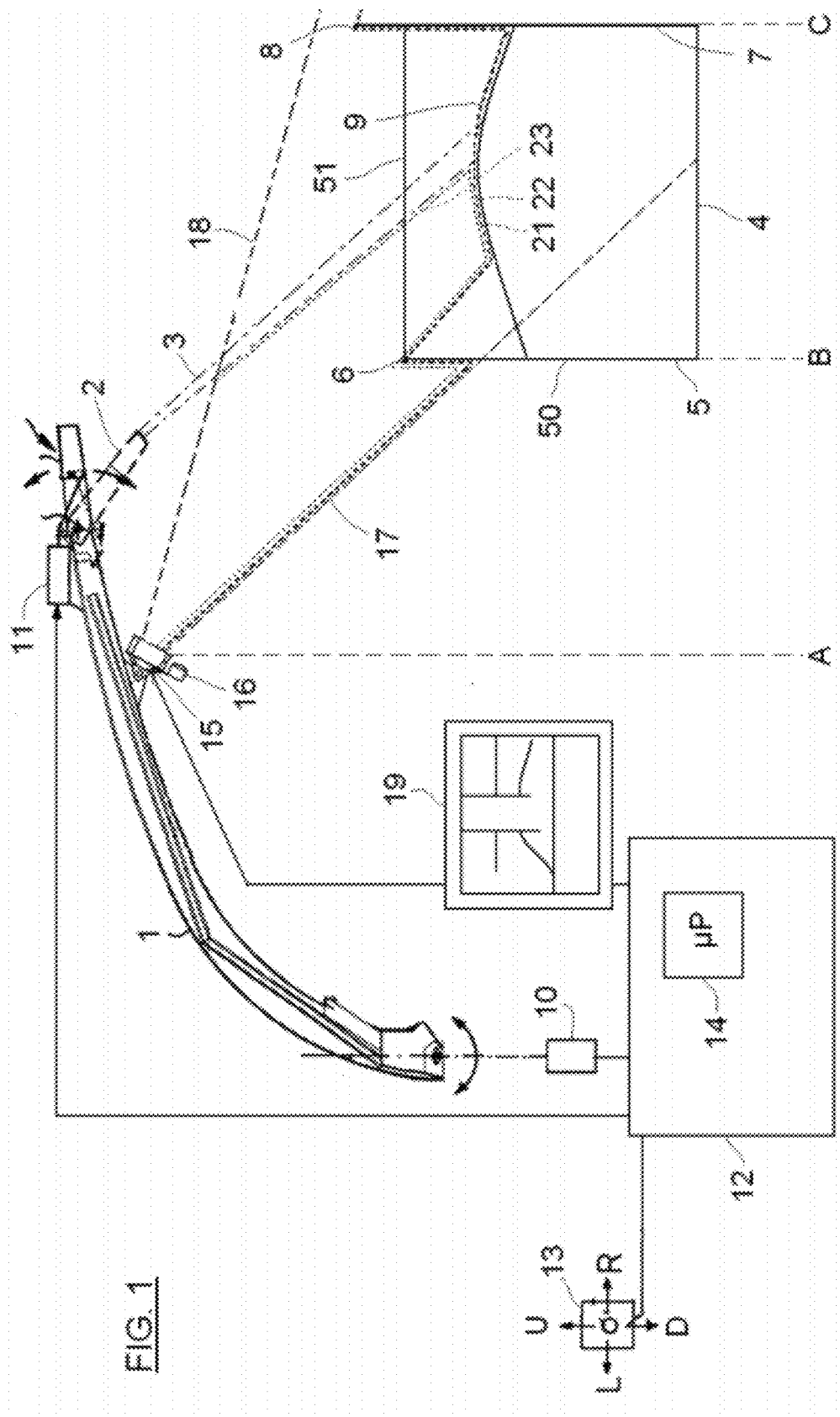
FIG. 1 is a schematic view of a filling spout equipped with a 3-D camera, positioned with respect to a filling container, in a position suitable for the method of the invention.

FIG. 1 is a schematic image of a discharge spout 1, the base of which is mounted for rotation about a vertical axis and pivotment about a horizontal axis on a forage harvester (not shown), in a manner known in the art. The spout mount is provided with an actuator, e.g., a hydraulic motor 10, for changing the angular position of the spout, and a further actuator, e.g., a hydraulic cylinder (not shown), for changing the height of the spout end. The spout further has a pivotable flap 2 at its end, provided with a third actuator, e.g., a linear electrical actuator 11. The three actuators are controlled by a control system 12 configured to direct the stream 3 of processed crop material into a container 4, governed by a manual control 13 or by a microprocessor 14. The container 4 has a near side wall 5, closest to the forage harvester and having an upper border 6, and an opposite, remote side wall 7 having an upper border 8. Crop material is deposited into the container 4 and forms a heap 9 therein, A 3-D camera 15 and preferably a light source 16 are mounted on the spout, in the position shown below the flap 2. The camera is configured to produce the image 19 as an array of pixels, and to determine the values of the distance from the camera to the object in the image, for each pixel in the image. These distances may be determined on the basis of the time-of-flight principle. The field of the camera is represented by the border lines 17 and 18.

Figure 2:
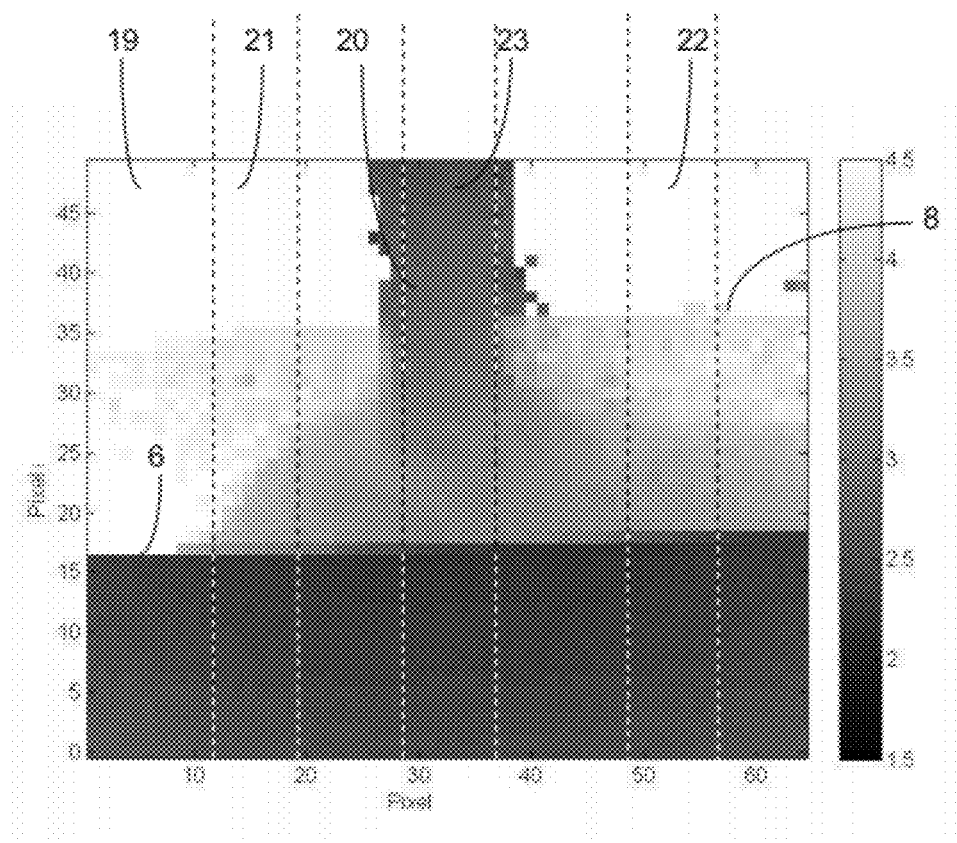
FIG. 2 shows an example of an image of a portion of the container on the basis of which image an analysis may be performed according to the invention.

The position of the camera with respect to the container 4 is such that in the horizontal direction, the camera is placed to one side of the container (i.e. the horizontal position A of the camera is not located between the transverse horizontal locations B and C of the side walls 5 and 6 of the container). In the vertical direction, the camera preferably is placed higher than the upper borders 6 and 7 of the side walls 5 and 6 of the container. As a consequence, the camera takes images in which the front surface of at least the near side wall 5 and possibly also the remote side wall 7 is visible (i.e. the surface facing the harvesting machine), as well as the near upper border 6 and possibly the remote upper border 8 of these side walls, as shown in the example in FIG. 2. The near upper border 6 (of the near side wall 5) is represented in the lower portion of the image, while the remote upper border 8 (of the remote side wall 7) is represented in the upper portion of the image. The image in FIG. 2 is taken while the spout is delivering crop material into the container. This ejected crop material is visible as a central region 20 in the image.

According to the method of the invention, the image 19 in FIG. 2 is analysed in order to detect at least the position of the near upper border 6 and, if visible, also the remote upper border 8, possibly also to detect a crop level of crop material already deposited in the container and/or the position of the front and rear borders of the container 4. The front and rear border may appear in the left or right portion of the image depending on the side of the forage harvester where the container is travelling. These position-related data are used in a control algorithm configured to control one or more of the following parameters: flap angle, angular spout position, spout height, container position, harvester position. These algorithms may be similar to known algorithms that make use of the relative position data of spout, container and/or crop material in the container as derived from images. Characteristic to the invention is the manner in which the image is analysed. In particular, instead of analysing the complete image, only a limited number of strips are selected in the image, in order to derive therefrom the required information.

In an image as shown in FIG. 2, a first and second vertical strip 21 and 22 are selected, said strips respectively being located to the left and right of the spout, i.e. to the left and right of the central region 20 in the image. According to a preferred embodiment, a third vertical strip 23 is selected in this central region 20. Each of the selected strips comprises a stack of rows of pixels, each row corresponding to a vertical position on the image, each pixel having a corresponding distance value, derived from the data contained in the image (given that the image is taken by a 3D time-of-flight camera). According to the invention, the distance data for each vertical position are then filtered to generate a single filtered distance value for that vertical position. According to the preferred embodiment, the filtered distance value equals the mean distance value for each vertical position in the strip. Also, the image data may contain data on the quality of each generated distance value, such as the light intensity for each position in the image, and the filtering may then comprise the step of disregarding the distance data that have a quality below a predetermined value.

Figures 3A, 3B, 3C:
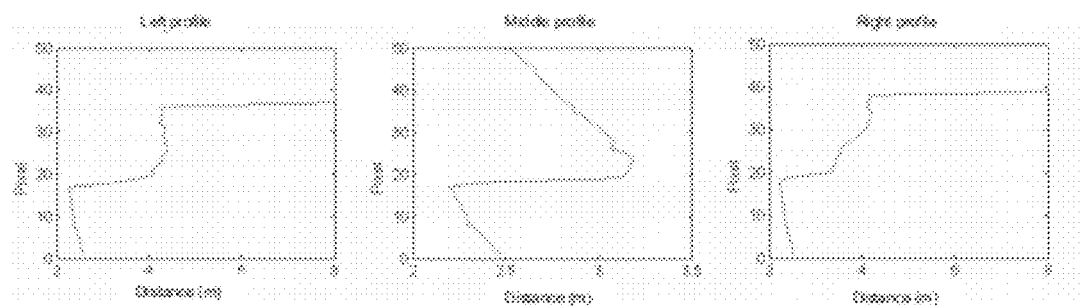
FIG. 3 shows examples of distance curves obtained and analysed in the method of the invention.

As a result, three distance curves are obtained, as shown in FIGS. 3A to 3C, corresponding to the filtered distances in strips 21, 23 and 22 respectively. The curves corresponding to the left and right strip 21 and 22 show clear jumps or leaps in the distance value in the regions where the near and remote upper borders 6 and 8 are shown. The curve corresponding to the central strip 23 shows a jump only at the location of the near upper border 6, given that the remote upper border is hidden behind the ejected crops in region 20. According to the invention, the vertical position of at least one upper border 6 or 8 is obtained from the location of one or both jumps, and the position of the spout 1 and flap 2 relative to the harvesting machine is controlled so as to direct the harvested crop into the container, i.e., to a position above the near upper border 6 and/or below the remote upper border 8. In case the jump of only one border is used, the control algorithm may be operable to direct the crop stream a predetermined distance from this border to the inside of the container. In case both borders are detected, the control algorithm may be operable to direct the crop in between these borders, e.g., halfway.

The distance values of the central strip 23 and in particular the distance value at the level of the container borders can be used for monitoring the position of the crop stream and adjusting the same with respect to the detected border or borders.

Figures 3D, 3E, 3F:
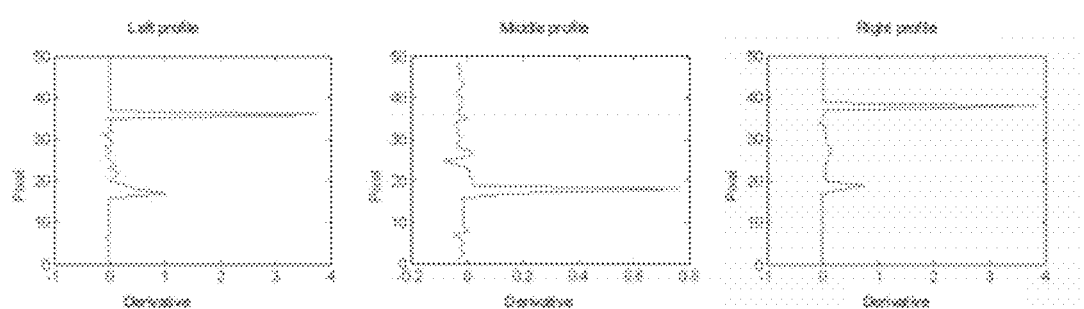

According to the preferred embodiment, the first and/or second derivative of the curves in FIGS. 3A to 3C are used as the basis for determining the vertical positions of the borders 6 and 8. As seen in FIGS. 3D to 3F, the first derivatives show sharp peaks at the location of borders 6 and 8. Such peaks can be more easily detected than the jumps in the distance curves in FIGS. 3A to 3C. Likewise, the second derivatives show similar peaks and can thus also be used as a basis for determining the position of borders 6 and 8. Derivatives will remove the average distance information and will sharply indicate the position and the number of borders within the range of the camera. When the first and/or second derivative is higher than a predetermined threshold it can be held that an edge is found.

According to a further embodiment, in addition to determining the position of one or both upper borders 6 and 8, the method comprises steps to determine the level of crop already deposited in the container. As the crop level rises, the image will contain, in between the near and remote upper borders 6 and 8, a region of crop material having an intersection line with the remote side wall 7. In each strip 21 and 22, the point of intersection between the crop and the remote side wall defines the crop level in said strip. Thus, from the same strips 21 and 22 as described above, to the left and right of the spout, the filtered distance values are analysed, and the vertical position is determined corresponding to the highest filtered distance value in the region between the near and remote upper borders 6 and 8. This vertical position then is the position corresponding to the crop level. Alternatively, the position between the near and remote upper borders having the maximum value of first and/or second derivative is selected as the position corresponding to the crop level. The method then further comprises the step of comparing the established crop level on both sides of the spout with the vertical position of the near side wall 5. When one of the crop levels at the left or right hand side of the spout reaches a predetermined level relative to the near upper border 6, the spout 1 is moved to a region of the container 4 that is not yet filled or, when the predetermined level is reached on both sides of the spout, the filling is stopped.

According to a further embodiment, a horizontal strip (30 or 31) is selected on an image as shown in FIG. 4A, said horizontal strip being located below (30) or above (31) the near upper border 6 of the container. The image in FIG. 4A shows the near and remote upper borders 6 and 8 of the container, and also its right corner 50 and right upper border 51. In the same manner as described above, the distance data for each horizontal position in said strip are filtered in order to generate a single filtered distance value for each horizontal position in the strip. From these filtered values, the positions of the right corner 50 and right upper border 51 of the container are derived. Examples of the distance profiles in the horizontal direction are illustrated in FIGS. 4B and 4C. The position of the right corner and right upper border of the container are derived by detection of a jump in the filtered distance, as visible in FIGS. 4B and 4C. The first and/or second derivatives of the curves in FIGS. 4B and 4C can also be used for detecting the horizontal position of the right hand corner and upper border. When the spout 1 and the attached camera 15 are directed to the opposite, left section of the container 4, the left corner and left upper border will become visible in the image and the same method involving filtered distance measurement can be used for establishing the horizontal position of these edges. The control algorithm uses these established positions to stop or revert the spout movement when the crop stream comes too close to the corner or left or right border.

The invention claimed is:

1. A method of directing a movable unloading apparatus of a harvesting machine to a container driven adjacent thereto, the container having near and remote upper borders the method comprising:
    employing a camera on the harvesting machine to capture images for a portion of the container, the camera generating image data on a distance between the camera and the portion of the container;
    processing the image data for a limited portion of a loading surface and not a whole thereof, the limited portion associated with one single vertical strip to a left of an unloading region and one single vertical strip to a right of the unloading region, to simplify processing;
    deriving therefrom data on a position of the portion of the container relative to the unloading apparatus; and using the position data for automatically moving the unloading apparatus relative to the harvesting machine towards a predetermined position relative to the container,
    wherein the processing act further comprises:
        generating a filtered distance value for each of single vertical strips, via filtering distance data that correspond to the single vertical strips; and
        analyzing for each of the single vertical strips sequence of filtered distance values for deriving therefrom a vertical position of at least one of the near or remote upper border of the container.

2. The method according to claim 1, wherein the act of filtering data on the distance further comprises:
    calculating a mean distance value for each vertical position and assigning said mean distance value to the filtered distance value for each of the single vertical strips.

3. The method according to claim 1 wherein the image data contains data associated with each generated distance value, and the act of filtering the distance data further comprises deleting the distance data that have a quality below a predetermined threshold.

4. The method according to claim 3, wherein the data associated with each generated distance value further comprises light intensity for each position in each of the single vertical strips.

5. The method according to claim 1 wherein the act of analyzing the sequence of filtered distance values further comprises:
    calculating at least one of a first or second derivative of the sequence of filtered distance values;
    comparing the derivative to a threshold value; and
    assigning the vertical position of a border of a container to the vertical position where the derivative exceeds the threshold value.

6. The method according to claim 1 wherein act of processing the image data further comprises:
    selecting from the captured image, the image data pertaining to a further vertical strip that is aligned with the moveable unloading apparatus
    filtering the distance data for each vertical position to generate a single filtered distance value corresponding thereto; and
    analyzing the sequence of filtered distance values for deriving therefrom the vertical position of the near upper border of the container for the further vertical strip.

7. The method of claim 1 wherein the act of processing the image data further comprises:
    analyzing the sequence of the filtered distance values for each of the single vertical strips-to obtain a level of a crop that is loaded in the container.

8. The method according to claim 7, wherein the act of analyzing the sequence of distance values for obtaining the level of any crop comprises:
    establishing the vertical position in between the vertical positions of the near and remote upper borders that has the greatest filtered distance value; and
    assigning the crop level to said established vertical position.

9. The method according to claim 7, wherein the act of analyzing the sequence of distance values for obtaining the level of any crop further comprises:
    calculating a derivative of the sequence of filtered distance values in between the vertical positions of the near and remote upper borders and
    assigning the crop level to the vertical position that has the greatest calculated derivative.

10. The method according to claim 7, wherein the predetermined position is established via following acts of:
    monitoring level of a crop in the container for each of the single vertical strips
    comparing obtained crop levels to a vertical position of at least one of the upper borders of the container;
    maintaining the present relative position as long as the obtained crop levels are a predetermined value below the vertical position of the at least one border; and if one of the vertical crop levels is less than the predetermined value below the vertical position of the border, moving the relative position of the unloading apparatus to the side having the greater distance between the crop level and the vertical position of the upper border.

11. The method according to claim 1, wherein the act of processing the image data further comprises:
   selecting from the captured image the image data pertaining to a horizontal strip below the near border of the container;
   filtering the distance data for each horizontal position to generate a single filtered distance value for that horizontal position; and
   deriving from the sequence of filtered distance values the relative position of the left of right hand corner of the container in the captured image.

12. The method according to claim 11, wherein the act of processing the image data further comprises:
   selecting from the captured image the image data pertaining to a horizontal strip above the near border of the container;
   filtering the distance data for each horizontal position to generate a single filtered distance value for that horizontal position; and
   deriving from the sequence of filtered distance values the relative position of the left or right hand upper borders of the container in the captured image.

13. The method according to claim 11, further comprising:
   comparing the derived relative position of the corner or border of the container to the horizontal position of the unloading apparatus; and
   upon finding a horizontal position difference below a predetermined threshold, stopping or reverting the movement of the unloading apparatus.

14. The method according to claim 1 wherein the camera is a 3D camera having an array of pixels, the camera employs the time of flight principle for determining the distance to the object for each pixel.

15. The method according to claim 1 wherein the camera is mounted on the movable unloading apparatus at a height above the upper borders of the container, such that it is capable of taking an image of the container comprising the near upper border positioned in a lower portion of the image and the remote upper border positioned in a higher portion of the image.

* * * * *